United States Patent
Parnell et al.

(10) Patent No.: US 6,647,396 B2
(45) Date of Patent: Nov. 11, 2003

(54) CLASSIFICATION BASED CONTENT MANAGEMENT SYSTEM

(75) Inventors: Todd C. Parnell, Austin, TX (US); Michael G. Uzquiano, Austin, TX (US); Scott C. Royston, Austin, TX (US)

(73) Assignee: Trilogy Development Group, Inc., Austin, TX (US)

( * ) Notice: Subject to any disclaimer, the term of this patent is extended or adjusted under 35 U.S.C. 154(b) by 243 days.

(21) Appl. No.: 09/750,611

(22) Filed: Dec. 28, 2000

(65) Prior Publication Data

US 2002/0124006 A1 Sep. 5, 2002

(51) Int. Cl.$^7$ ................................. G06F 17/30
(52) U.S. Cl. ..................... 707/102; 707/7; 707/10; 707/103 R; 707/104.1
(58) Field of Search ................ 707/7, 10, 103 R, 707/104.1, 102

(56) References Cited

U.S. PATENT DOCUMENTS

| | | | | |
|---|---|---|---|---|
| 5,519,865 A | * | 5/1996 | Kondo et al. .................. 707/7 |
| 5,781,857 A | * | 7/1998 | Hwang et al. ............... 455/412 |
| 5,862,325 A | * | 1/1999 | Reed et al. ............. 395/200.31 |
| 5,924,090 A | * | 7/1999 | Krellenstein .................... 707/5 |
| 5,983,170 A | * | 11/1999 | Goodman ....................... 704/9 |
| 5,983,246 A | * | 11/1999 | Takano ........................ 707/514 |
| 6,055,543 A | * | 4/2000 | Christensen et al. ..... 707/104.1 |
| 6,130,962 A | * | 10/2000 | Sakurai ....................... 382/190 |
| 6,324,538 B1 | * | 11/2001 | Wesinger, Jr. et al. ........ 707/10 |
| 6,334,145 B1 | * | 12/2001 | Adams et al. ............... 709/217 |
| 6,336,119 B1 | * | 1/2002 | Banavar et al. .......... 707/104.1 |
| 6,351,556 B1 | * | 2/2002 | Loui et al. ................... 382/164 |
| 6,405,212 B1 | * | 6/2002 | Samu et al. ................. 707/103 |
| 6,460,050 B1 | * | 10/2002 | Pace et al. ................ 707/104.1 |

FOREIGN PATENT DOCUMENTS

GB       2 355 818 A    *  2/2001    ........... G06F/17/30

OTHER PUBLICATIONS

Tidwell, Doug, "Servlets and XML: Made for each other,"*IBM: developerWorks: XML: Library —papers*, ibm-.com/software/developer/library/servlets–and–xml/index.html.

\* cited by examiner

*Primary Examiner*—Frantz Coby

(57) ABSTRACT

A classification based content management system provides a content management system in which large amounts of content may be quickly and easily managed. More specifically, the classification based content management system of the present invention uses metadata to classify the content in such a way that the content may be quickly and easily managed. The classification based content management system provides advantages in a variety of aspects of the operation of the system. The aspects of the operation of the system include storage, retrieval, access control and workflow management.

51 Claims, 6 Drawing Sheets

CLASSIFICATION BASED CONTENT MANAGEMENT SYSTEM

BACKGROUND OF THE INVENTION

1. Field of the Invention

The present invention relates to the field of content management, and more particularly relates to content management in an internet environment.

2. Description of the Related Art

Content management generally relates to storing and administering various types of data files. One of the challenges associated with known content management systems is that the data is presented and organized within a single hierarchy. For small amounts of content, such as that found in small web sites, a single hierarchy may suffice, but when dealing with a large amount of data, users who are only interested in a small set of the data can easily be overwhelmed. Further, the single hierarchy approach limits the ways content can be accessed, access controlled and referenced at runtime, generally referred to as ACLed (Access Control List Serviced).

It is known to use proprietary text markup inside of managed HTML pages. The general architecture in which the proprietary text markup is used is referred to as a tag architecture; the small additional tags that form the proprietary text markups are generally referred to as custom taglets. This proprietary text is processed by content management tools statically, and results in a simple replacement scheme for the proprietary text. However, this schema doesn't allow the running of complex logic at runtime, and forces users to use a proprietary markup language.

SUMMARY OF THE INVENTION

It has been discovered that providing a classification based content management system provides a content management system in which large amounts of content may be quickly and easily managed. More specifically, the classification based content management system of the present invention uses metadata to classify the content in such a way that the content may be quickly and easily managed. The classification based content management system provides advantages in a variety of aspects of the operation of the system. The aspects of the operation of the system include storage, retrieval, access control and workflow management.

More specifically, in one aspect, the invention relates to a method for managing content. The method includes storing a plurality of items of content within a database; generating metadata for each of the plurality of items of content, the metadata including classification information for classifying the content; and storing, in the database, the classification information associated with a particular item of content, the classification information being related to the item of content.

In another aspect, the invention relates to a content management system which includes an application portion, an interface portion coupled to the application portion and a database portion. The database portion stores a plurality of items of content. The database portion includes metadata for each of the plurality of items of content. The metadata includes classification information for classifying the content. The database stores the classification information associated with a particular item of content and the classification information is related to the particular item of content.

In another aspect, the invention relates to a database for use with a content management system. The database includes a document portion and a classification portion. The document portion stores a plurality of items of content. The classification portion stores classification information that is associated with a particular item of content. The classification information is related to the particular item of content.

In another aspect, the invention relates to a method for managing content where a plurality of items of content are stored within a database. The method includes providing metadata for each of the plurality of items of content, the metadata including classification information for classifying the content, the classification information being related to the item of content; and accessing, in the database, the content based upon the classification information associated with a particular item of content.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Overview

In addition to traditional content management metadata like version, date, author, the present invention stores specific classification metadata on the content. The specific information collected may vary (i.e., deployments may choose any number or type of classifiers), but a prototypical example might store Class, Category, and Vendor (or Color, Size, and Season) for every piece of content in the content management system.

Content that is richly classified via a classification scheme can be retrieved at run time (i.e., from dynamic pages on the web site). This allows site creators freedom to specify logical relationships in a site. For example, a site so designed can extract all content with Type=Press Release and automatically get all current press releases as they are entered into the content management system without further modification to his page.

Once data has been richly classified, access controls may be set to make use of the metadata on the individual pieces of content. Users can see different data depending on the role that they are trying to accomplish. For instance, a graphics department could be allowed to modify only the graphics files. By using multiple classifiers to define the data, a user (or user group) can see, edit, or delete specific content. Customized views into the data can be provided and data integrity and minimal user confusion (e.g., by hiding files not related to the person's task) can be insured.

Workflows can be made to depend on content classification. For example, all image files may be made to require graphics department approval, and all materials relating to a new marketing campaign require approval of the vice president of marketing. Using complex classification-based workflows, it is possible to automatically route a single marketing image to both graphics and the vice president automatically.

Structure

Figure 1:
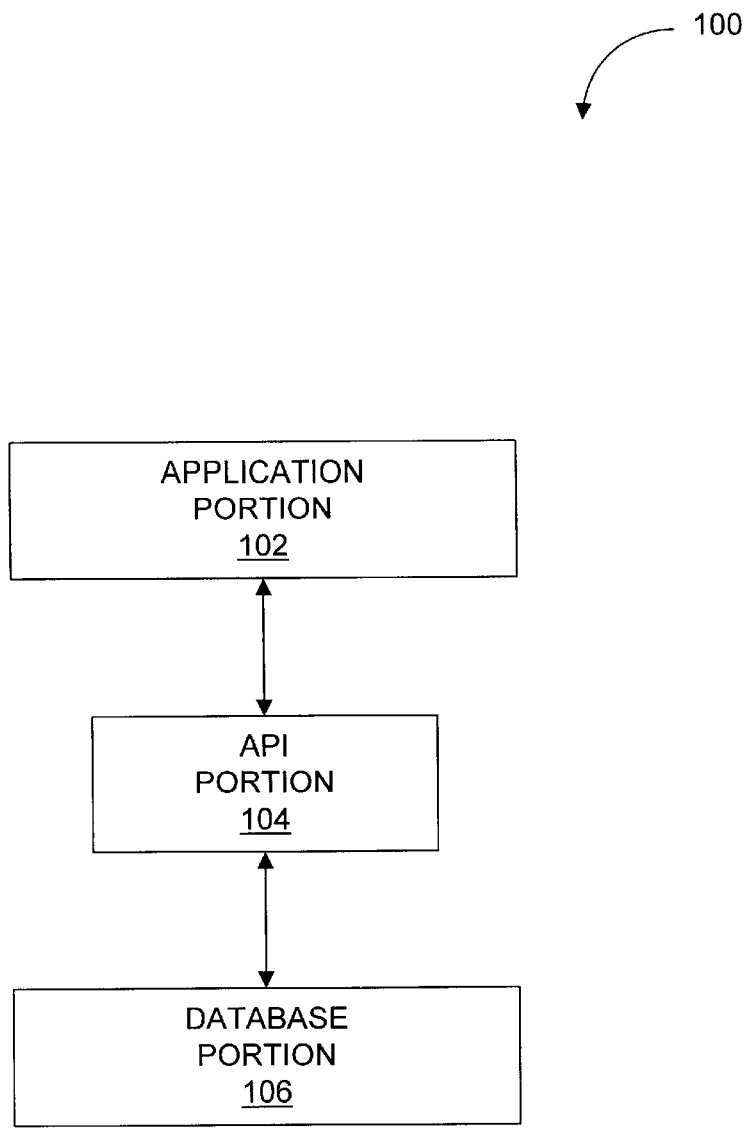
FIG. 1 shows a block diagram of a classification based content management system in accordance with the present invention.

Referring to FIG. 1, content management system 100 includes an application portion 102, an application program interface (API) portion 104 and a database portion 106. Each portion provides a separate aspect of content management system 100. The application portion 102 is the portion of the content management system 100 with which an end user interacts. The application portion 102 then interacts with the database portion 106 via the API portion 104.

Figure 2:
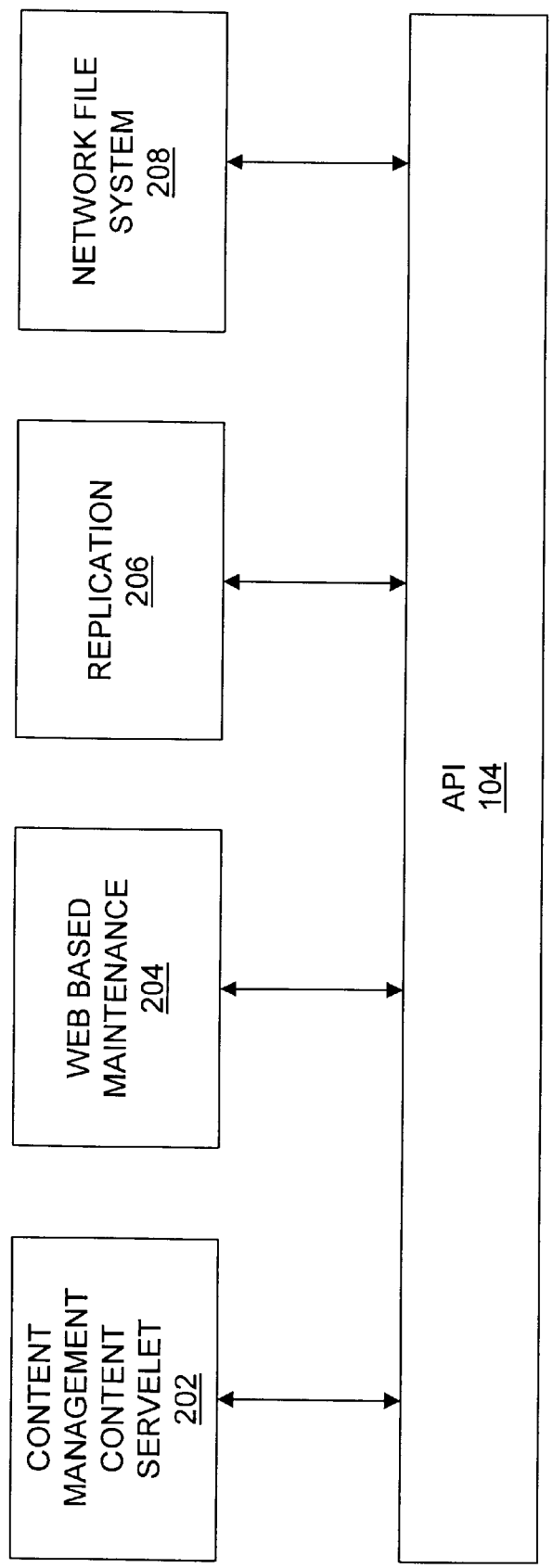
FIG. 2 shows a block diagram of an application portion of the classification based content management system of FIG. 1.

Referring to FIG. 2, application portion includes a content management content servlet module (CMCS) 202, a web based maintenance module 204, a replication module 206 and a network file system module 208.

The content management content servlet 202 provides the main access via which end website users interact with the content management system 100, i.e. the CMCS 202 provides the main execution point which performs the processing every time that a web page is accessed. CMCS 202 performs a plurality of functions. More specifically, CMCS 202 provides fast serving of the web page and allows parsing of content tags. Regarding the parsing of content tags, CMCS 202 identifies a particular requested tag and queries the database 106 regarding the requested tag. The tags then reference and execute against the metadata stored within the content management system 100. Thus, this function allows explicit, declarative statements to be written (e.g., put all type=press release HERE). The database then returns documents that conform to the requested tag. By allowing content to be returned based upon parsed tags, it is now possible for content to be separated from the presentation of a web page.

The web based maintenance module 204 provides the main administration point via which a webmaster, administrator or content creator can access all content management modules throughout the content management system 100.

The replication module 206 provides a variety of replication functions. More specifically, the replication module 206 allows a developed web site to be served out for public access. The replication module 206 also allows a web site to be incrementally updated. The replication module 206 also allows publishing and importing of web site content. The replication module 206 also provides a file transfer protocol (ftp) interface to content management system 100. Additionally, the replication module 206 also allows a subscription model such that a subscriber may register interest in an entire web site or perhaps a subset of the content based classifiers (e.g., a user may subscribe to all of the news related to a particular company). This replication can be either into an identical content management system that is maintained by the user or into a generic file system using the ECMPathLink table (see FIG. 4). So for example, a user could subscribe to all GIF files from a particular provider and then store all of the content so classified into a specific local directory (e.g., C:\Graphics).

The network file system module 208 provides an alternate access to the database portion 106. This alternate access allows access other than through a web view access. The network file system module 208 is discussed in more detail in the application entitled Hierarchical Interface to Attribute Based Database by Todd C. Parnell filed on Dec. 22, 2000.

Figure 3:
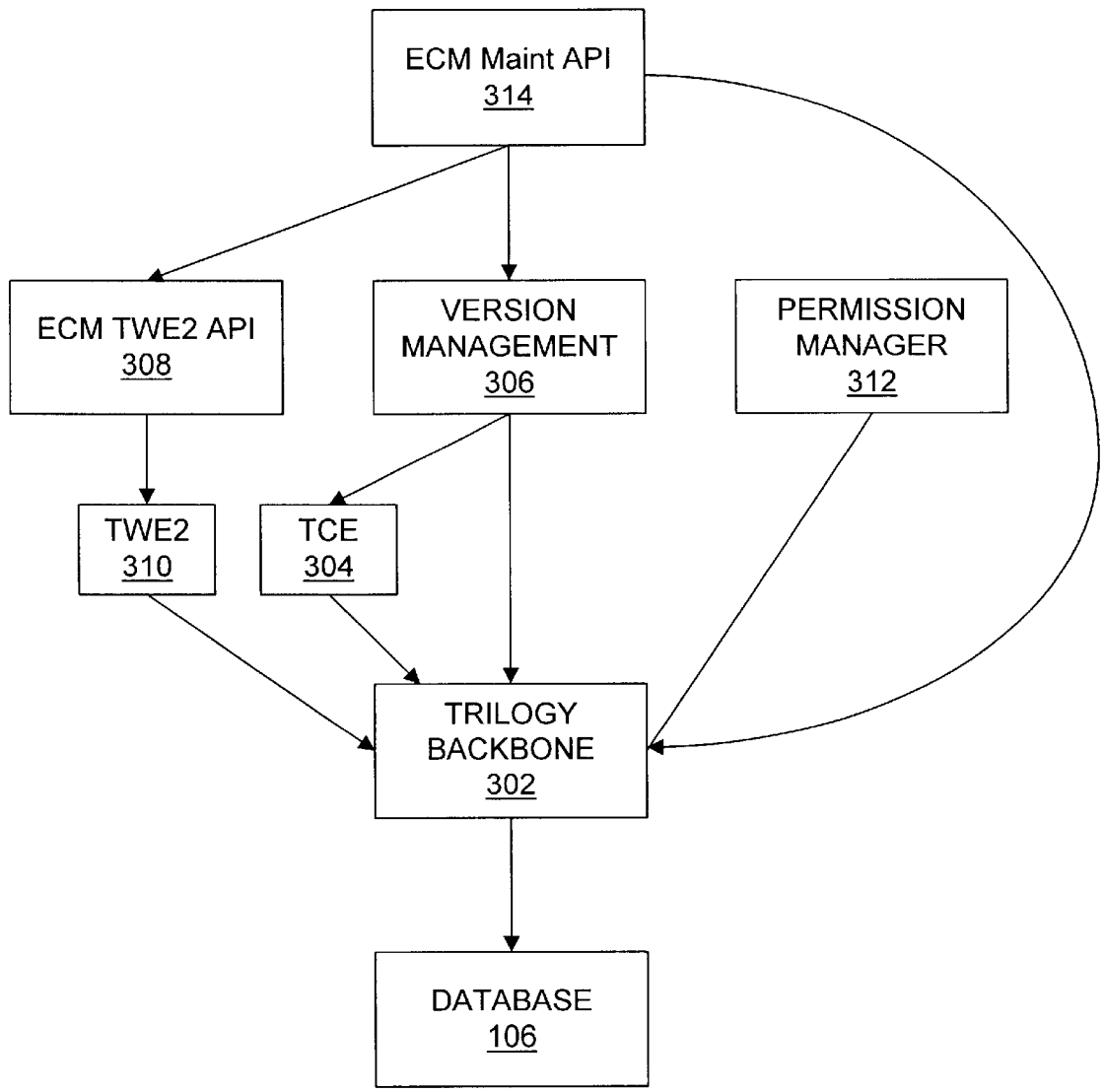
FIG. 3 shows a block diagram of an interface portion of the classification based content management system of FIG. 1.

Referring to FIG. 3, API portion 104 includes a plurality of modules. More specifically, API portion 104 includes a backbone module 302, a classification engine module 304, a version management module 306, a workflow engine API module 308, a workflow engine module 310, a permission manager module 312 and a maintenance API module 314.

The backbone module 302 provides object/persistence support. Specifically, the backbone provides the infrastructure within content management system 100 to allow object loading, saving, transactional support and database independence.

The classification engine module 304 provides database schema independence to content management system 100. Specifically, in a preferred embodiment, the classification engine module 304 generates SQL queries based upon user requests that are then used to access the database portion 106 of content management system 100. If multiple tables were present within the database system then the classification engine module would allow access to the multiple tables. The classification engine module 304 also provides the ability to update the number and type of classifiers within database schema at runtime.

The version management module 306 performs a plurality of version management functions. Specifically, the version management module 306 allows check-in/check-out), editioning, content typing and access to the database using a browsing metaphor. The browsing metaphor allows the content, which is stored within the content management database, to be accessed much like a typical operating system file system. This functionality allows searching for content as well as manipulating locations of content. Using the browsing metaphor, the known cut/copy/paste commands can classify or reclassify content based upon where the content is copied or pasted. Because location of content is intimately related to classification, manipulating the location implicitly reclassifies documents. Under the browsing metaphor files equal documents and folders equal classification of documents.

The workflow engine module 310 functions using a node model. The workflow engine module allows flow through the workflow, specification of types of data to be input and logic that run on the types of data. The workflow engine API module 308 allows manipulation based upon classifiers and classification information. Examples of classification information include the document, user, site, specific workflow and other types of classification information.

The maintenance API module 314 provides a set of programming interfaces to manipulate the data model. The maintenance API module 314 allows the content management system 100 to separate the presentation view of data from the manipulation of data. The maintenance API module 314 includes common graphical user interface (GUI) functions when working within the content management system 100. The maintenance API module 314 also includes wizard like helper portion to allow generation of documents automatically from forms. The API module 314 also includes model validation functionality.

The permission manager module 312 allows ACL functionality based upon classification information. This ACL functionality includes ACLs that can be set such as read, write, set edition, remove from edition, set effectivity date, delete, etc.

Figure 4:
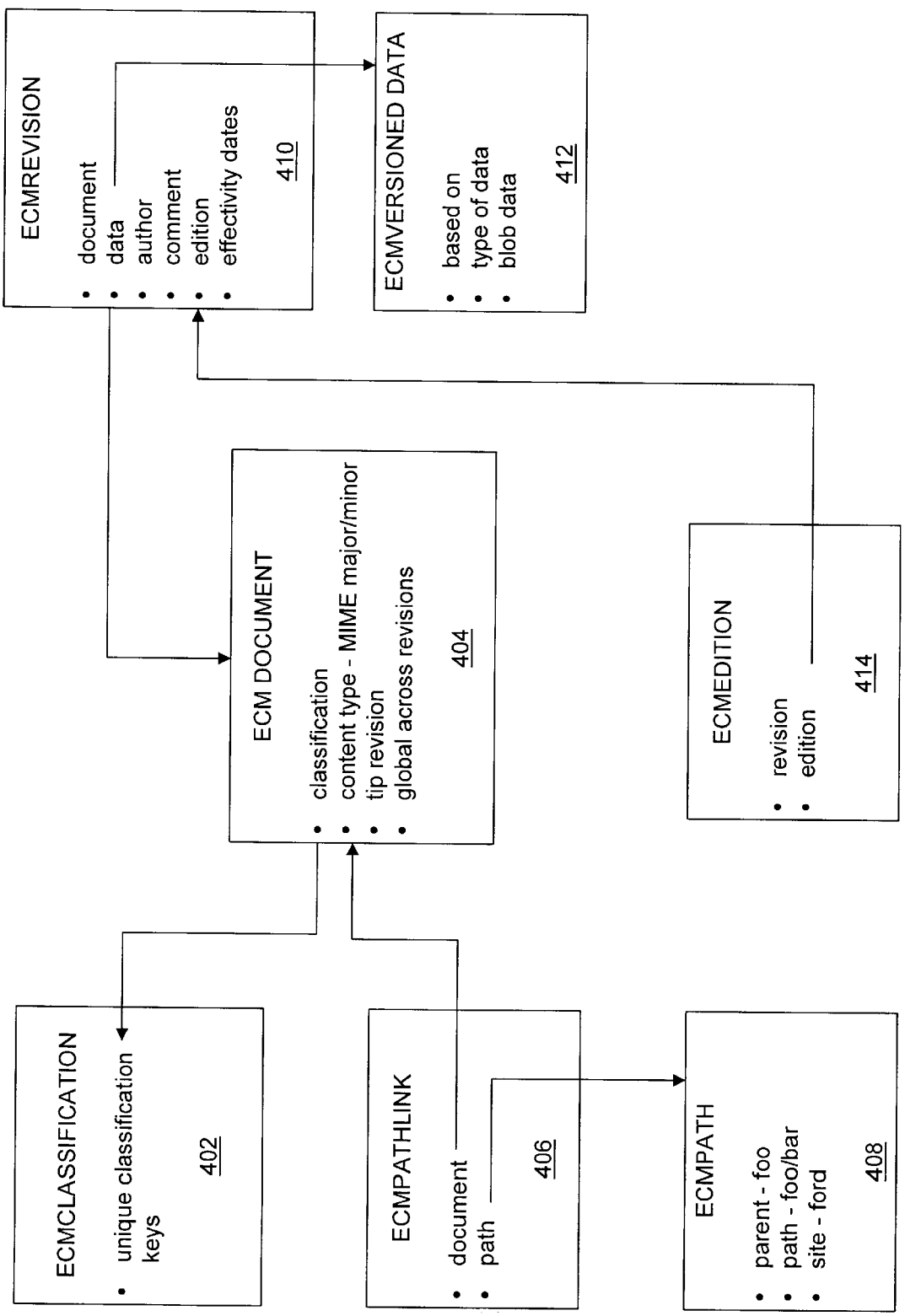
FIG. 4 shows a block diagram of a database portion of the classification based content management system of FIG. 1.

Referring to FIG. 4, database portion 106 includes a plurality of tables. These tables may be stored within a single database or within a plurality of linked databases. More specifically, database portion 106 includes ECMClassification table 402, ECMDocument table 404, ECMPathLink table 406, ECMPath table 408, ECMRevision table 410, ECMVersion table 412 and ECMRevEditions table 414. In the database portion 106, documents represent items that are versioned. A document may conceptually include classification information.

ECMClassification table 402 is the main storage point for classification information. ECMClassification table 402 is implemented as a single large table, where columns are the classification axes and rows are the classifications for a particular document. Documents may have null values for classifiers. Note that this table contains only the generic or user defined classifiers. Content Management exposes the other tables' columns as classifications of a document. For instance, content type is stored in two columns on the document, but is generally available as a classifier for that document. In an alternate embodiment, the ECMClassification table may be divided into multiple distinct tables. Additionally, ECMClassification table 402 may include, whether conceptually or architecturally, classifier groups. Classifier groups are sets of classification axes that generally are manipulated as a group. Classifier groups are an example of information that may be stored in a distinct table.

ECMDocument table 404 stores the named document objects in the content management system 100. ECMDocument table 404 is often used in joins between revisions and the classification table. Note that, in a preferred embodiment, content type is defined here, so that the content type cannot be changed between revisions in the preferred embodiment.

ECMRevision table 410 represents a single, immutable version of a document. Revisions are created once by a single author in a revision control manner, i.e. check in, check out. The storage of the actual data in a revision is left to a versioned data object, which hides the details of the actual data storage. Revisions can be effectivity-dated to show up only at certain times, or can be added or removed from editions. Revisions store who created the revision, who approved the revision, and any incidental comments on that revision that resulted from any workflow on that revision.

ECMVersionedData table 412 is the storage unit for a single revision. These objects store the type of storage mechanisms, the actual database blob object, and a pointer to the data this revision was based on. In a preferred embodiment, Versioned Data objects store their data in one of two ways: simple byte array or length aware byte array. The length aware byte array has a 4 byte header that indicated the total length of the actual data. In alternate embodiments, content management system 100 may support storing diffs between revisions in the database.

EMCPath table 406 allows content management system 100 to provide compatibility to file system based content management systems. Paths represent a virtual point in a specific file system (e.g., a specific web site.) Paths are aware of their parent for performance reasons. The site column allows users to put a single file into multiple paths. (i.e., site1 path='/foo', site2 path='/bar' for a single doc). Paths can be used for replication as well as to provide a data migration function between existing web sites that are stored using a known path based architecture and served using content management system 100 in which the paths represent the only classification. The user may then add additional classifiers to provide additional functionality and to make more use of classification based content management system 100.

EMCPathLink table 408 maintains the many to many relationship between document and path.

EMCEdition table 414 provides cross-document labeling. Individual revisions can be tagged as belonging to a specific edition (or multiple editions) and will be grouped together logically (for serving on a web site, for example). The database schema of content management system 100 allows strings to be used interchangeably with the actual ECMEdition object.

An example of how the tables within database system 106 are organized is set forth as follows:

```
ECMDocument:
    Name -> String
    Classification -> ECMClassification
    ContentType -> String
    TipRevision -> Integer
ECMClassification:
    [Multiple] -> String
ECMRevision:
    Document -> ECMDocument
    Data -> ECMVersionedData
    Author -> SCUser [generic user table]
    Comment -> String
    Edition -> String
    Effectivity Dates -> Date
ECMVersionedData:
    BasedOn -> ECMVersionedData
    Data ->Blob [generic wrapper around db blobs]
    Type -> Integer
ECMPathLink
    Document -> ECMDocument
    Path -> ECMPath
ECMPath:
    Parent -> String
    Path -> String
    Site -> String
ECMRevEditions:
    Revision -> ECMRevision
    Edition -> String
ECMEdition:
    Name -> String
```

Operation

One way to describe the operation of content management system 100 is by setting forth a plurality of examples of how content management system 100 functions. These examples are intended to be illustrative only and in no way limiting.

One example of the operation of content management system 100 would be a system administration user administering a web site. The design and implementation of the web site is the first aspect of administering the web site and the maintenance of the data is another aspect of administering of the web site.

When using classification based content, a web site can be designed and implemented using the classifiers, e.g., put the latest press releases here, or use the latest copy of our corporate logo. In these examples, one classifier for the press release documents would be the date of release. In the corporate logo example, the revision history would then be used to determine which version of the corporate logo to present.

In another example, the classifier could be used to identify all documents that conform to certain criteria. For example, when a user accesses a web page relating to a particular high end construction tool, a classification search would then produce other high end construction tools and present them on the same page, thus presenting cross-sell and up-sell opportunities. See FIG. 5.

Figure 5:
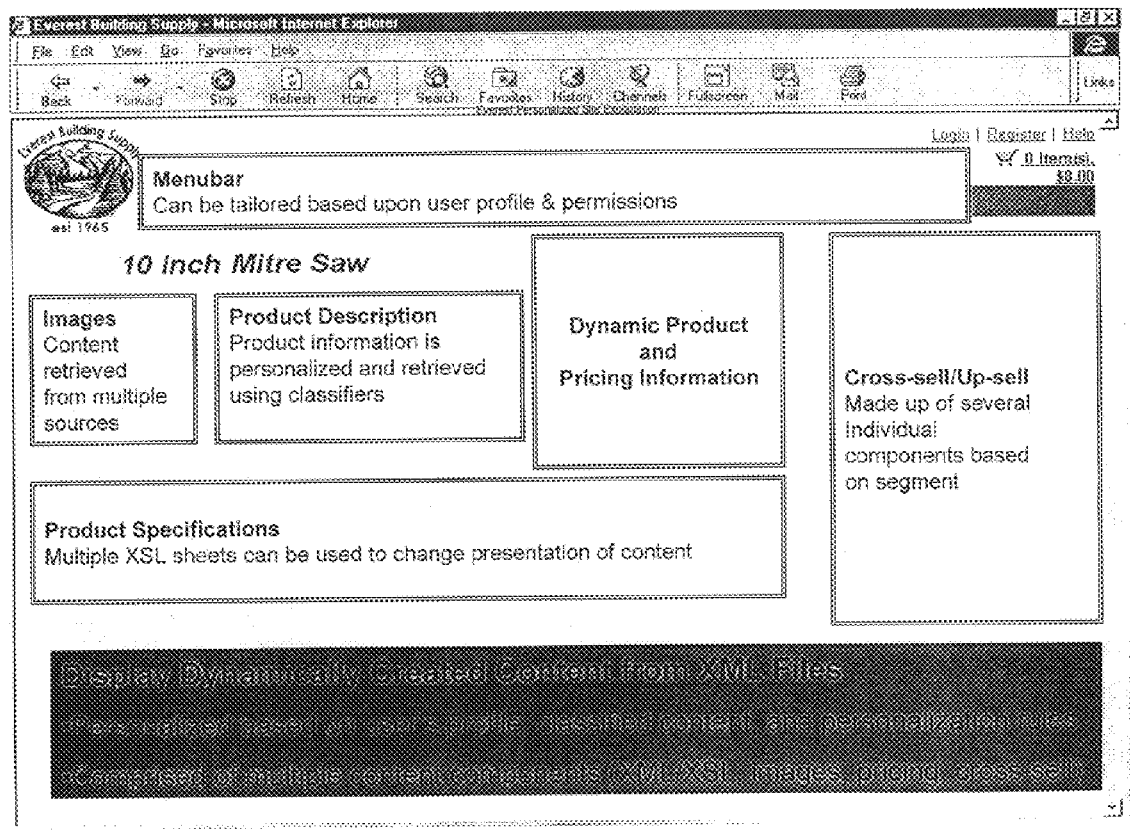
FIG. 5 shows an example of a screen presentation that makes use of a content management system in accordance with various aspects of the present invention.

FIG. 5 also presents how content management system 100 is used by a system administration user to maintain data. More specifically, different system administration users may be responsible for different content. One user may be responsible for product specifications while another user is responsible for the images that relate to particular products. When each of these users completes their respective content, the content may then be served when the web page is accessed.

Figure 6:
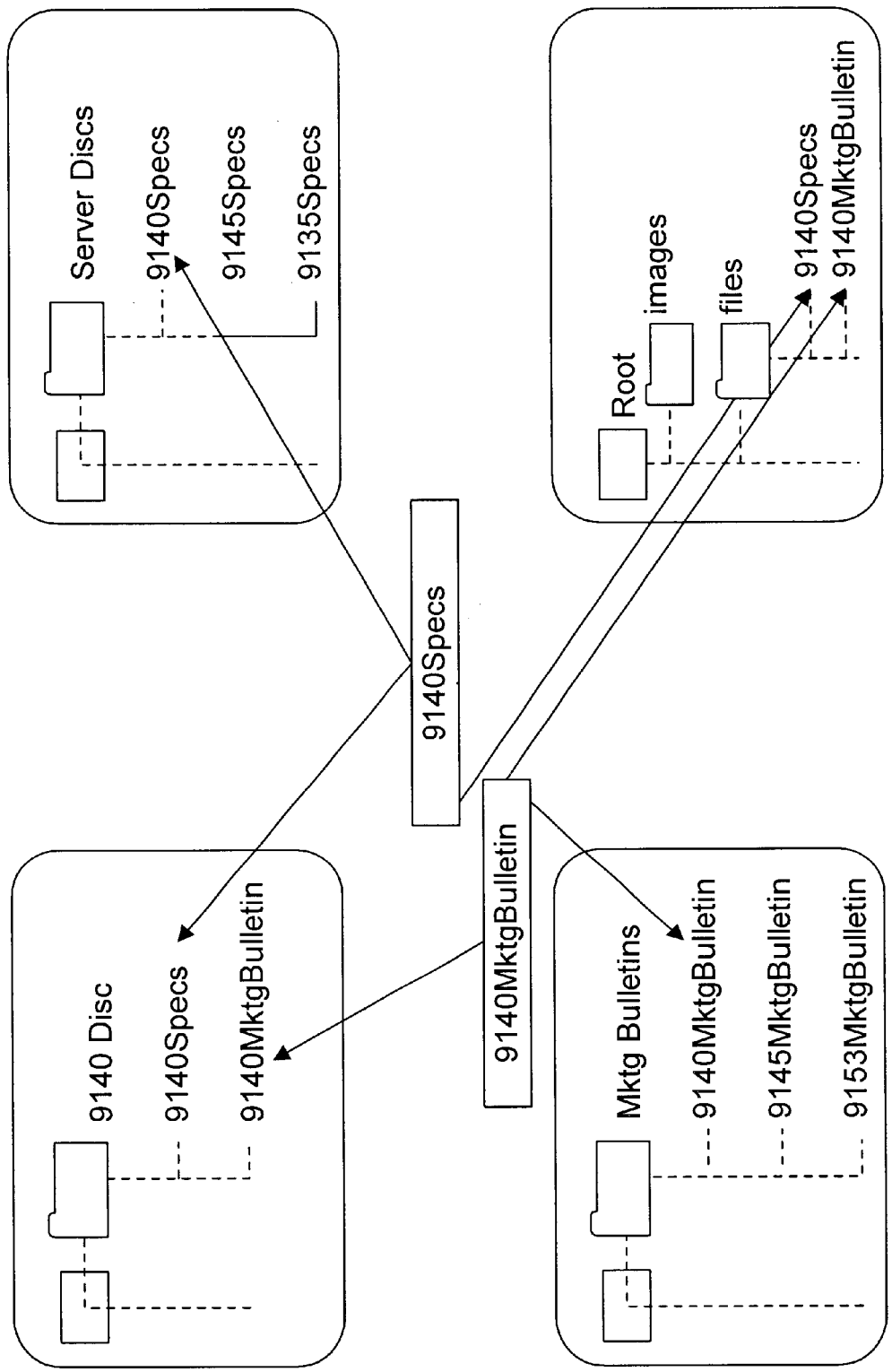
FIG. 6 shows a diagrammatic block diagram of an example how different users would have access to different content when using a content management system in accordance with various aspects of the present invention.

Another example of the operation of content management system 100 is set forth with reference to FIG. 6. Content management system 100 allows customized views and manipulation of the content based upon classification values. For example, an engineer may have both viewing and manipulation access to particular product specification documents but only viewing access to marketing bulletin documents. A product manager may have viewing access to product specification documents as well as marketing bulletin documents. A marketer may have viewing and manipulation access to the marketing bulletin documents. The Site manager may have a path based view to a global hierarchy of all of the data related to a particular site.

Another example of the operation of content management system 100 is a web user accessing a web site which incorporates content management system 100. When the web user accesses the web site, the fact that a content management system is present is transparent to the user. When the web site is accessed, user requests are forwarded to the content management servlet by the content management system. The servlet then accesses the various APIs necessary to access the content that is required to present the web page. The content is then presented via known web technology.

Other Embodiments

Other embodiments are within the following claims.

What is claimed is:

1. A method for managing content comprising
   storing a plurality of items of content within a database;
   generating metadata for each of the plurality of items of content, the metadata including classification information for classifying the content;
   storing, in the database, the classification information, including classifiers, associated with a particular item of content, the classification information being related to the item of content;
   controlling user access to the items of content by granting a user access to items of content associated with particular classifiers; and
   providing a subset of the items of content to a user, wherein the subset of the items of content provided to the user is provided based on one or more classifiers for which a user has been granted access.

2. The method for managing content of claim 1, further comprising
   administering workflow of the plurality of items of content based upon the classification information.

3. The method for managing content of claim 1 further comprising
   retrieving at least some of the plurality of items of content at run time based upon the classification information.

4. The method for managing content of claim 1 further comprising
   controlling access to the plurality of items of content based upon the classification information.

5. The method for managing content of claim 1 further comprising:
   receiving data from the user indicating interest in the subset of the items of content based upon one or more classifiers; and
   establishing a user subscription to only the subset of the items of content indicated by the received data.

6. The method for managing content of claim 1 further comprising:
   specifying a workflow for the subset of items of content depending upon one or more classifiers of the items of content; and
   wherein providing a subset of the items of content to a user further comprises:
   automatically routing the subset of the items of content having classifiers specified in the workflow to a user associated with the workflow.

7. The method of managing content of claim 6 further comprising:
   generating web pages for the user by extracting the subset of the items of content based on the classifiers for which a user requests and has access.

8. The method of claim 1 wherein controlling user access to the items of content further comprises:
   controlling a type of access.

9. The method of claim 8 wherein the type of access is selected from the group comprising view content, manipulate content, edit content, and delete content.

10. A content management system comprising:
    an application portion;
    an interface portion coupled to the application portion;
    a database portion coupled to the interface portion, the database portion storing a plurality of items of content, the database portion including metadata for each of the plurality of items of content, the metadata including classification information for classifying the content, and the database storing the classification information, including classifiers, associated with a particular items of content, the classification information being related to the particular item of content; and
    an access control portion to control user access to the items of content by granting a user access to items of content associated with particular classifiers; and
    a providing portion to provide a subset of the items of content to a user, wherein the subset of the items of content provided to the user is provided based on one or more classifiers for which a user has been granted access.

11. The content management system of claim 10 wherein the application portion further comprises
    a content management content servlet, the content management content servlet providing controlled access to the content management system when the content management system is accessed by the user.

12. The content management system of claim 11 wherein the content management content servlet enables the content management system to parse the plurality of items of content based upon the classification information.

13. The content management system of claim 10 wherein the application portion further comprises
    a replication portion, the replication module enabling the user to access the subset of items of content using a subscription model.

14. The content management system of claim 13 wherein the subscription model enables a subscriber to register interest in a portion of a web site that incorporates the content management system and the items of content associated with the particular classifiers.

15. The content management system of claim 10 wherein the interface portion further comprises
a backbone portion, the backbone portion providing infrastructure support to the content management system.

16. The content management system of claim 10 wherein the interface portion further comprises
a classification engine portion providing database schema independence to the content management system.

17. The content management system of claim 10 wherein the interface portion further comprises
a version management portion, the version management portion providing version management functionality to the content management system.

18. The content management system of claim 10 wherein the interface portion further comprises
a workflow engine portion, the workflow engine portion allowing the plurality of items of content to be manipulated based upon the classification information.

19. The content management system of claim 10 wherein the interface portion further comprises
a maintenance portion, the maintenance portion enabling the content management system to separate a presentation view of data from manipulation of the data.

20. The content management system of claim 10 wherein the interface portion further comprises
a permission manager portion, the permission manager portion allowing ACL (Access Control List) functionality based upon classification information.

21. The content management system of claim 10 wherein the database portion further comprises
a document portion, the document portion storing the plurality of items of content,
a classification portion, the classification portion storing the classification information corresponding to the plurality of items of content.

22. The content management system of claim 21 wherein the database portion further comprises
a revision portion, the revision portion storing revision information relating the plurality of items of content.

23. The content management system of claim 21 wherein the database portion further comprises
a versioned data portion, the versioned data portion storing a single revision relating to a corresponding item of content.

24. The content management system of claim 21 wherein the database portion further comprises
a path portion, the path portion storing information representing a path corresponding to an item of content.

25. The content management system of claim 21 wherein the database portion further comprises
an edition portion, the edition portion storing information so that at least two of the plurality of items of content may be identified as belonging to an edition.

26. The content management system of claim 10 further comprising:
a receiving portion to receive data from the user indicating interest in the subset of the items of content based upon one or more classifiers; and
a subscription portion to establish a user subscription to only the subset of the items of content indicated by the received data.

27. The content management system of claim 10 further comprising:
a workflow portion to specify a workflow for the subset of items of content depending upon one or more classifiers of the items of content; and
wherein the providing portion further comprises a portion to automatically route the subset of the items of content having classifiers specified in the workflow to a user associated with the workflow.

28. The content management system content of claim 27 further comprising:
a web page generation portion to generate web pages for the user by extracting the subset of the items of content based on the classifiers for which a user requests and has access.

29. The content management system of claim 10 wherein the access control portion further comprises a portion to control a type of access.

30. The content management system of claim 29 wherein the type of access is selected from the group comprising view content, manipulate content, edit content, and delete content.

31. An apparatus comprising
a database for use with a content management system and organized to control user access to a plurality of items of content in the database by granting a user access to items of content associated with particular classifiers and to allow provision of a subset of the items of content to a user, wherein the subset of the items of content provided to the user is provided based on one or more classifiers for which a user has been granted access, the database comprising:
a document portion, the document portion storing a plurality of items of content;
a classification portion, the classification portion storing classification information, the classification information, including classifiers, associated with a particular item of content, the classification information being related to the particular item of content.

32. The apparatus of claim 31 wherein the database further comprises
a revision portion, the revision portion storing revision information relating the plurality of items of content.

33. The apparatus of claim 32 wherein the revision information includes effectivity date information.

34. The apparatus of claim 31 wherein the database further comprises
a versioned data portion, the version data portion storing a single revision relating to a corresponding item of content.

35. The apparatus of claim 31 wherein the database further comprises
a path portion, the path portion storing information representing a path corresponding to an item of content.

36. The apparatus of claim 31 wherein the database further comprises
an edition portion, the edition portion storing information so that at least two of the plurality of items of content may be identified as belonging to an edition.

37. The apparatus of claim 31 further comprising:
a receiving portion to receive data from the user indicating interest in the subset of the items of content based upon one or more classifiers; and
a subscription portion to establish a user subscription to only the subset of the items of content indicated by the received data.

38. The apparatus of claim 31 further comprising:

a workflow portion to specify a workflow for the subset of items of content depending upon one or more classifiers of the items of content; and wherein the providing portion further comprises a portion to automatically route the subset of the items of content having classifiers specified in the workflow to a user associated with the workflow.

39. The apparatus of claim 38 further comprising:

a web page generation portion to generate web pages for the user by extracting the subset of the items of content based on the classifiers for which a user requests and has access.

40. The apparatus of claim 31 wherein the database is further organized to control a type of access.

41. The content management system of claim 40 wherein the type of access is selected from the group comprising view content, manipulate content, edit content, and delete content.

42. A method for managing content where a plurality of items of content are stored within a database, the method comprising providing metadata for each of the plurality of items of content, the metadata including classification information for classifying the content, the classification information being related to the item of content;

controlling user access to the items of content by granting a user access to items of content associated with particular classifiers included in the classification information;

accessing, in the database, the content based upon the classification information associated with a particular item of content; and providing a subset of the items of content to a user, wherein the subset of the items of content provided to the user is provided based on one or more classifiers for which a user has been granted access.

43. The method for managing content of claim 42 further comprising administering workflow of the plurality of items of content based upon the classification information.

44. The method for managing content of claim 42 further comprising retrieving the subset of the items of content at run time based upon the classification information.

45. The method for managing content of claim 42 further comprising controlling access to the plurality of items of content based upon the classification information.

46. The method for managing content of claim 42 further comprising:

receiving data from the user indicating interest in the subset of the items of content based upon one or more classifiers; and establishing a user subscription to only the subset of the items of content indicated by the received data.

47. The method for managing content of claim 42 further comprising:

specifying a workflow for the subset of items of content depending upon one or more classifiers of the items of content; and wherein providing a subset of the items of content to a user further comprises:

automatically routing the subset of the items of content having classifiers specified in the workflow to a user associated with the workflow.

48. The method of managing content of claim 47 further comprising:

generating web pages for the user by extracting the subset of the items of content based on the classifiers for which a user requests and has access.

49. The method of claim 42 wherein controlling user access to the items of content further comprises:

controlling a type of access.

50. The method of claim 49 wherein the type of access is selected from the group comprising view content, manipulate content, edit content, and delete content.

51. An apparatus comprising a database for use with a content management system and organized to control user access to a plurality of items of content in the database by granting a user access to items of content associated with particular classifiers and to allow provision of a subset of the items of content to a user, wherein the subset of the items of content provided to the user is provided based on one or more classifiers for which a user has been granted access, the database comprising:

a document portion, the document portion storing the plurality of items of content, a classification portion, the classification portion storing classification information, the classification information, including the classifiers, associated with a particular item of content, the classification information being related to the particular item of content;

a revision portion, the revision portion storing revision information relating the plurality of items of content;

a versioned data portion, the versioned data portion storing a single revision relating to a corresponding item of content;

a path portion, the path portion storing information representing a path corresponding to an item of content; and an edition portion, the edition portion storing information so that at least two of the plurality of items of content may be identified as belonging to an edition.

\* \* \* \* \*